(12) United States Patent
Lauke

(10) Patent No.: US 8,508,064 B2
(45) Date of Patent: Aug. 13, 2013

(54) GONDOLA WITH MULTI-PART MAIN SHAFT

(75) Inventor: Andreas Lauke, Gruibingen (DE)

(73) Assignee: Schuler Pressen GmbH & Co. KG, Döppingen (DE)

( * ) Notice: Subject to any disclaimer, the term of this patent is extended or adjusted under 35 U.S.C. 154(b) by 614 days.

(21) Appl. No.: 12/798,146

(22) Filed: Mar. 30, 2010

(65) Prior Publication Data
US 2010/0253087 A1 Oct. 7, 2010

(30) Foreign Application Priority Data
Apr. 1, 2009 (DE) .................. 10 2009 015 926

(51) Int. Cl.
*F03D 9/00* (2006.01)

(52) U.S. Cl.
USPC .......................................... 290/55

(58) Field of Classification Search
USPC .......................................... 290/44, 55
See application file for complete search history.

(56) References Cited

U.S. PATENT DOCUMENTS

| | | | |
|---|---|---|---|
| 3,690,784 A * | 9/1972 | Desmond | 415/54.1 |
| 6,285,090 B1 * | 9/2001 | Brutsaert et al. | 290/55 |
| 6,504,260 B1 * | 1/2003 | Debleser | 290/44 |
| 6,911,741 B2 * | 6/2005 | Pettersen et al. | 290/44 |
| 6,921,243 B2 * | 7/2005 | Canini et al. | 415/4.3 |
| 8,125,095 B2 * | 2/2012 | Duffey et al. | 290/44 |
| 8,247,916 B2 * | 8/2012 | Numajiri | 290/44 |
| 8,310,072 B2 * | 11/2012 | Reitz | 290/44 |
| 2007/0075548 A1 * | 4/2007 | Bagepalli et al. | 290/55 |
| 2008/0205812 A1 * | 8/2008 | Landwehr | 384/549 |
| 2008/0272604 A1 * | 11/2008 | Versteegh | 290/55 |
| 2009/0134627 A1 * | 5/2009 | Stiesdal | 290/55 |
| 2010/0026010 A1 * | 2/2010 | Pabst | 290/55 |
| 2010/0264664 A1 * | 10/2010 | Lauke | 290/55 |
| 2010/0295308 A1 * | 11/2010 | Post | 290/52 |
| 2011/0187122 A1 * | 8/2011 | Martinez et al. | 290/55 |
| 2011/0204647 A1 * | 8/2011 | Numajiri | 290/55 |
| 2011/0309632 A1 * | 12/2011 | Rebsdorf | 290/55 |

FOREIGN PATENT DOCUMENTS

| | | |
|---|---|---|
| DE | 35 36 47 | 5/1922 |
| WO | WO 00/60719 | 10/2000 |
| WO | WO 2008078342 A1 * | 7/2008 |
| WO | WO 2010037846 A2 * | 4/2010 |

* cited by examiner

*Primary Examiner* — Tulsidas C Patel
*Assistant Examiner* — Viet Nguyen
(74) *Attorney, Agent, or Firm* — R. S. Lombard; K. Bach

(57) ABSTRACT

In the gondola (2) of a wind power plant (1) according to the invention the main shaft comprises several parts. The rotors (21, 45) of the generators (4, 5) are parts of the main shaft. Other shaft sections (17, 18) are used for supporting the main shaft (3) on the machine carrier or, respectively the gondola frame (7) and the attachment of the rotor hub (6). The generators (4, 5) may be completely pre-assembled and delivered as mounting units. During the pre-assembly of the generators, the rotor (21) and the stator (26) are fixed relative to one another by mounting aids. The mounting aids, interlocking devices, are removed after the whole drive train is mounted to the machine carrier (7).
The stator of the generator (26) is mounted on the machine carrier (7) via adjustable supports.

3 Claims, 2 Drawing Sheets

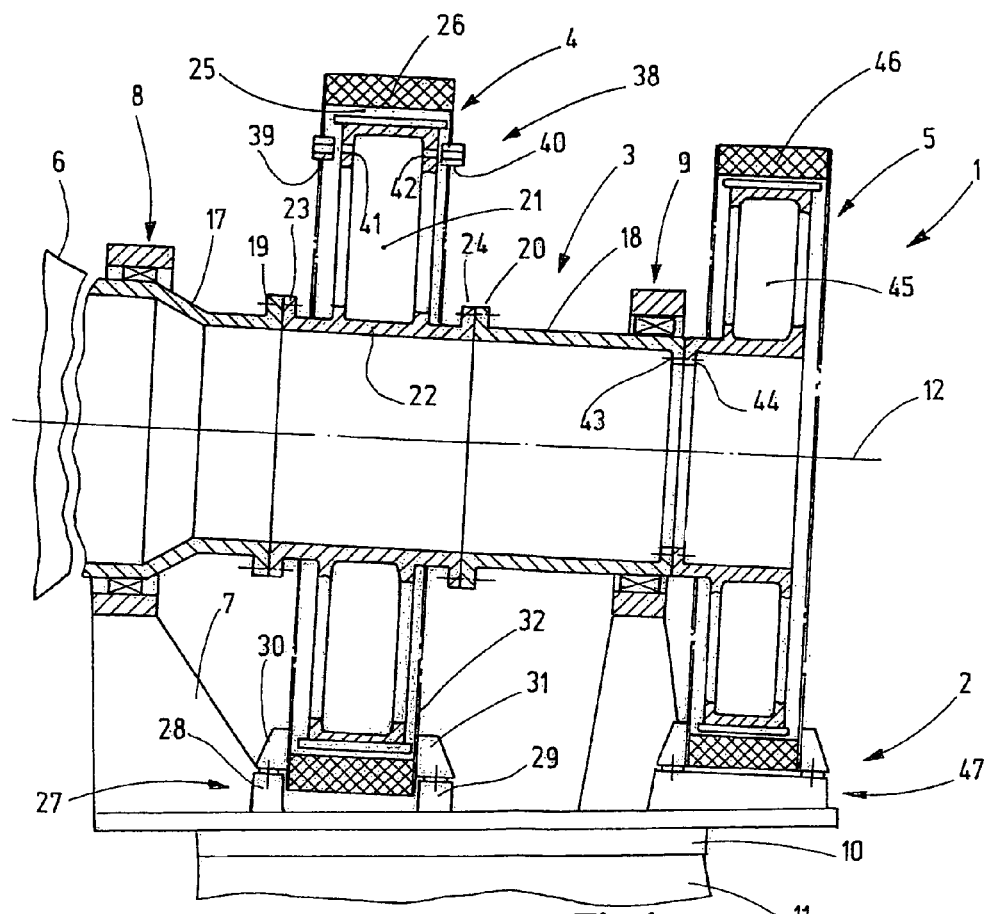

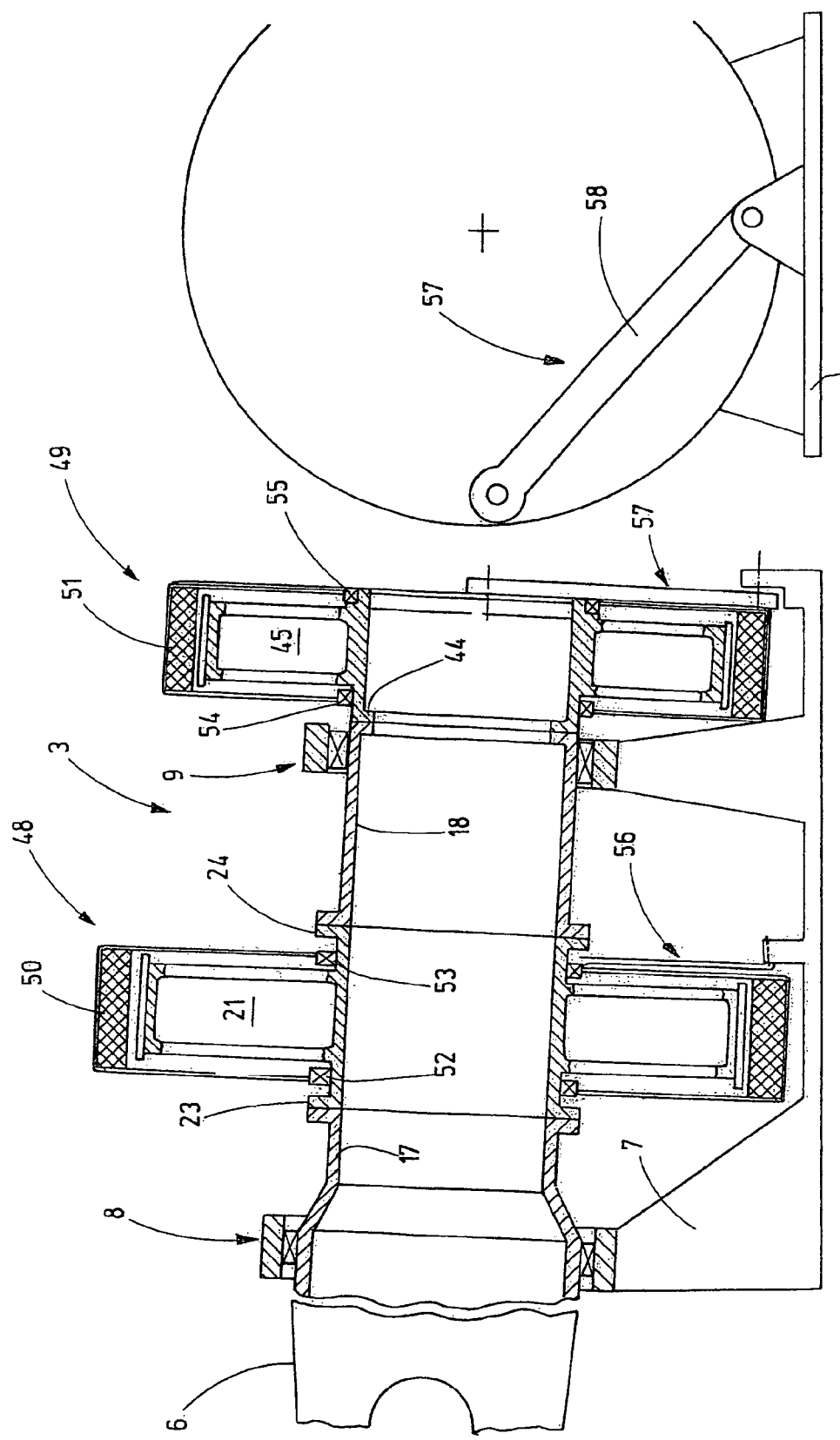

GONDOLA WITH MULTI-PART MAIN SHAFT

CROSS-REFERENCE TO RELATED APPLICATION

This application claims the priority benefits of German Application No. 10 2009 015 926.6-15 filed Apr. 1, 2009.

BACKGROUND OF THE INVENTION

The invention concerns a gondola of a wind power plant for the generation of electricity.

Wind power plants are often set up at remote locations and have substantial dimensions which may result in manufacturing and transportation problems. The designers therefore need to design the wind power plant in such a way that it operates reliably over long periods with little service requirements and that it can be manufactured and installed in an efficient manner.

It is known to provide in wind power plants several generators which are all driven by a common main shaft.

This is disclosed for example in DE 35 36 47. The wind power plant described therein comprises a gondola with a gondola frame in which a main shaft is rotatably supported by two bearings. Between the main bearings generators are arranged whose rotors are connected to the main shaft for rotation therewith and are driven thereby. The main shaft is driven by a blade wheel.

Furthermore, WO 00/60719 A1 discloses a wind power plant with a shaft which carries at one end the rotor hub and, at its opposite end a generator. The main shaft is rotatably supported by the gondola frame via two main bearings. The stator of the generator rotor is also connected to the gondola frame.

Based hereon it is the object of the present invention to provide an improved concept for a rugged wind power plant and the installation thereof.

SUMMARY OF THE INVENTION

In the gondola (2) of the wind power plant (1) according to the invention the main shaft comprises several parts. The rotors (21, 45) of the generators (4, 5) are parts of the main shaft. Other shaft sections (17, 18) are used for supporting the main shaft (3) on the machine carrier or, respectively the gondola frame (7) and the attachment of the rotor hub (6). The generators (4, 5) may be completely pre-assembled and delivered as mounting units. During the pre-assembly of the generators, the rotor (21) and the stator (26) are fixed relative to one another by mounting aids. The mounting aids, interlocking devices, are removed after the whole drive train is mounted to the machine carrier (7). The stator of the generator (26) is mounted on the machine carrier (7) via adjustable supports.

The gondola according to the invention includes a main shaft which is divided between the two main bearings into at least two shaft sections. Preferably a generator is arranged between the two shaft sections. To this end, the generator shaft is connected at its opposite ends to the shaft sections of the main shaft in such a way that the rotor and the two shaft sections attached to the rotor form a rigid component rotatably supported by two main bearings.

This concept of a main shaft being divided between the two main bearings permits the manufacture of the main shaft or, respectively, the shaft sections by economical manufacturing methods. Preferably, the shaft sections are cast components which consist for example of cast iron or cast steel. This permits an optimization of the form of the main shaft with respect to the transmission of torque and with respect to bending moment stressing. For example the segments of the divided main shaft can be designed with respect to the shape thereof so as to accommodate the effective loads with minimal use of material and optimized in this regard. The segments or, respectively the shaft sections can be provided with internal longitudinal ribs which improve the bending rigidity of the shaft. Also spiral ribs may be provided to improve the rotational rigidity of the shaft sections. The shaft section arranged between the rotor hub and the first generator can be designed for a higher torque than the subsequent shaft section. The hollow shaft may also serve as servicing access to the hub interior. If necessary, a manhole may be provided in one of the shaft sections. Ribs extending around the manhole to prevent a weakening of this shaft section by the manhole.

The division of the main shaft into several shaft sections also facilitates the incorporation of several generators into the main shaft. For example a generator may be arranged at the end of the main shaft outside the two main bearings whereas another generator is arranged between the shaft sections of the main shaft and, consequently, is arranged between the main bearings of the gondola frame. This arrangement facilitates the generation of a large electric power output with comparatively small generators which can be handled relatively easily.

The concept furthermore facilitates the mounting of the gondola, the main shaft and the generators on a tower with reasonable expenditures. For example the shaft sections and the generators can be lifted onto the gondola frame and can be assembled there. The size of the components can be limited to a value at which, preassembled, they can still be transported. This results in obvious advantages and reduced costs for the manufacture, the transport and the assembly of the generators. For high power generators an overland-transport of the completed generators including the stator is made possible by the concept according to the invention.

Also, the electromagnetic forces and the deformations and vibrations initiated by the generators are easier to control in the smaller generators whose use is made possible by the invention. Furthermore, the use of several generators in one main shaft provides for a certain redundancy. Upon breakdown of one generator the other generator or generators remain operable. The division of the main shaft makes an arrangement of two or more rotors in the main shaft possible in a simple manner. The rotors or respectively, the rotor shafts of the generators become parts of the main shaft. If two or more generators are provided, the torque path for driving of the generators more remote from the hub extends through rotors or rotor shafts of the generators closer to the hub.

The concept according to the invention is particularly advantageous in connection with wind power plants including generators without their own rotor support bearings. In this case, the rotor of the respective generator is supported concentrically with the stator by the support bearings of the main shaft. The concept according to the invention makes it possible that the generators are completely factory-assembled including stator and rotor. They can be temporarily interconnected by retaining means. If the generator is a permanently magnetized synchronous generator, the retaining means take on the forces which tend to de-center the rotor with respect to the stator that is the forces which tend to move the rotor out of its center position within the stator. They hold the rotor centered within the stator. In this state, the generator can be installed in the gondola and connected that is mounted to the main shaft sections and to the gondola frame. Afterwards, the retaining means can be disconnected so that the rotor is released. The rotor is now maintained in a center position by the main shaft and the support structure thereof.

In a preferred embodiment such a bearing-less generator is provided with at least one adjustment means by which the position of its stator in the gondola frame and with respect to the rotor can be adjusted. The adjustment means can be formed for example by an adjustable support structure for the stator on the gondola frame. During installation, the generator is lifted into the gondola with its rotor locked and centered and is mounted in place to the main shaft so that the main shaft first supports the complete generator. In the next step, for example, the adjustment means provided on the stator support are so adjusted that the stator support is adapted to the position of the stator and the generator is connected to the gondola frame. Then, upon disconnection of the locking means the stator remains in its position relative to the rotor and in this way is centered.

Alternatively one or several generators may be supported by the shaft. In that case the generator includes a rotor bearing which supports the stator, that is the rotor supported by the main shaft and the rotor support the stator. The stator is then connected to the gondola frame preferably only by a torque strut so as to prevent rotation of the stator. Otherwise, it is freely movable. This embodiment permits the provision of particularly small air gaps. However, this solution is more expensive since it requires additional non-friction bearings between the rotor and the stator. It may be used however for one or several generators.

The invention will become more readily apparent from the following description of the particular embodiment thereof on the basis of the accompanying drawings.

BRIEF DESCRIPTION OF THE DRAWINGS

FIG. 1 shows schematically a gondola of a wind power plant in a vertical cross-sectional view;
FIG. 2 shows part of a main bearing of the gondola of FIG. 1;
FIG. 3 shows a stator support provided with adjustment means;
FIG. 4 shows an adjustment structure;
FIG. 5 shows an alternative embodiment of a gondola of a wind power plant; and,
FIG. 6 shows the gondola of FIG. 5 in a frontal view.

DESCRIPTION OF PREFERRED EMBODIMENTS

FIG. 1 shows a gondola 2 of a wind power plant 1, including a main shaft 3 and generators 4, 5. The main shaft 3 carries at one end thereof a hub 6 which is shown only schematically and which is provided with rotor blades so as to be rotated by wind.

The gondola 2 comprises a gondola frame 7 on which at least two main bearings are supported, rotationally supporting the main shaft 3. The gondola 2 is supported on an upper end of a tower 11 via a gondola bearing 10. The gondola bearing 10 has a vertical axis of rotation. The main bearings define an axis of rotation 12 which extends essentially horizontally or at an acute angle with respect to a horizontal direction.

The two main bearings 8, 9 are mounted at a certain support distance from each other so that at least one of the two generators 4, 5 can be arranged between the two main bearings 8, 9 as it is shown in FIG. 1. The main bearings are only schematically shown in FIG. 1. Preferably they are fixed-loose bearings. Both bearings support the main shaft 3 in the radial direction. The main bearing 8 additionally supports the shaft 3 in the axial direction and therefore is a so-called fixed bearing. The main bearing 9 on the other hand is preferably a loose bearing. It does not support the main shaft in the axial direction but rather permits a certain axial movability of the shaft. Both main bearings are preferably non-friction bearings, for example ball bearings, roller bearings, conical roller bearings, self-aligning roller bearings or similar. Preferably, the front main bearing 8 which is close to the rotor hub is a self-aligning roller bearing as it is indicated for example in FIG. 2. It includes as rolling bodies for example rollers 13, 14 which are arranged in two annular rows between an outer bearing ring 15 and an inner bearing ring 16. The races of the rollers may be inclined relative to each other and with respect to the axis 12 to provide for an axial force transmission. However, preferably no such axial support is provided for the main bearing 9.

The main shaft 3 is preferably a hollow shaft. It is divided into at least two shaft sections 17, 18, wherein the shaft section 17 is supported by the main bearing 8 and the shaft section 18 is supported by the main bearing 9. At their facing ends, the two shaft sections 17, 18 include connecting means for example in the form of radial flanges 19, 20 between which the generator 4 is accommodated. To this end, the generator 4 includes a rotor 21 whose rotor shaft 22 is a hollow shaft. The inner diameter of the shaft 22 corresponds preferably essentially to the inner diameter of the adjacent shaft section 17, 18. The rotor shaft 22 is provided at its ends with flanges 23, 24 which are firmly bolted to the flanges 19, 20. For centering the rotor shaft 22 with respect to the shaft sections 17, 18 the respective flange pairs 19/23 and, respectively 24/20 may be provided with form-matching engagement means, for example annular mating steps, mating bolts, tight-fit bolts or screws or similar devices.

The generator 4 is preferably a permanently magnetized synchronous generator. In this case, the rotor 21 carries at its preferably cylindrical outer circumference permanent magnets whose field passes through an air gap. The air gap 25 is provided between the outer circumference of the rotor 21 and the inner circumference of a stator 26.

As shown in FIG. 1, the stator is supported on the gondola frame 7. To this end, the gondola frame 7 is provided with a stator support structure 27. As support structure mounting blocks 28, 29 may be provided to which support members 30, 31 of the stator housing 32 are bolted. The stator support structure 27 is preferably adjustable so that it can be adapted to the desired stator position. For example as shown In FIG. 3, an intermediate member 33 of a particular selected thickness or an adjustable thickness is disposed between the mounting block 28 and the holder 30. FIG. 4 shows an embodiment with an adjustable intermediate member 34 comprising two wedges 35, 36 with their wedging surfaces disposed adjacent each other and provided with a through-bore. The wedges 35, 36 may be moved relative to each other by an adjustment structure, not shown, in order to change their combined vertical height, see FIGS. 3, 4. For securing the support members 30 to the mounting block 28 a bolt may be used which is indicated in FIG. 3 only by a dash-dotted line 37.

The generator 4 includes a locking means 38 for fixing the rotor 21 to the stator 26. The locking means 38 is designed so as to be suitable to hold the rotor centered on the stator 26 until the rotor 21 and the stator 26 are installed in the gondola 2. In the shown embodiment, the locking means 38 comprises a number of sleeve-like holders 39, 40 which are mounted to the stator housing and whose through-bores are in alignment with bores in the stator 21. Locking bolts, not shown, are inserted into the sleeves 39, 40 whose ends extend into the bores 41, 42. The bolts lock the rotor 21 to the stator 26, so that it can not rotate or move axially and a uniform air gap width is established over the whole circumference of the rotor 21.

The main shaft 3 may be connected at its ends remote from the hub 6 to an additional generator 5 which is preferably of the same basic design as the generator 4. For connection to the shaft section 18, the shaft section 18 may be provided at its end disposed outside the main bearing 9 with an inwardly projecting flange 43 which is connected to a corresponding flange 44 of the rotor 45 of the generator 5. The stator 46 of the generator 5 again is connected to the gondola frame 7 via a stator support structure 47 which is preferably adjustable. Concerning the adjustability, the explanations provided in connection with the stator support structure 27 apply also here.

The gondola 1 described above can be mounted as follows:

First, the gondola frame 7 is mounted onto the upper end of the tower 11. Then the gondola 2 is prepared for the accommodation of the generators 4, 5. To this end, the shaft section 17 is installed into the main bearing 8. This is facilitated if the shaft section 17 has a larger outer diameter in the area of the main bearing 8 than at its flange 19. In this way, the shaft section 19 can be inserted from the front through the main bearing 8. The shaft section 18 can be inserted into the pre-mounted main bearing 9 in the same direction. This is particularly easy to do if the shaft section 18 includes outside the main bearing 9 no part which extends beyond the inner diameter of the main bearing 9. It is therefore advantageous that the flange 43 extends inwardly.

When the shaft sections 17, 18 are disposed in the main bearings 8, 9, the preassembled generator 4 is placed into the gondola. At this point, the rotor 21 of the bearing-less completely pre-assembled generator 4 is fixed in the stator 26 by the locking means 38. The generator 4 is now so positioned between the shaft sections 17, 18, that the flanges 23, 24 abut the flanges 19, 20. After a corresponding concentric alignment, the flanges 19, 23 and, respectively, 24, 20 are firmly bolted together. In addition the stator support structure 27 is adapted to the position of the stator 26. This can be accomplished by a selection and installation of intermediate member 33 of the appropriate thickness or the adjustment of adjustable intermediate members 34. Subsequently the stator 26 is bolted to the stator support structure. Then the locking means which are disposed in the sleeves 39, 40 can be removed.

Similarly, the generator 5 is pre-assembled. Also, its rotor 45 is supported and fixed concentrically in the stator 46 by locking means which are not shown. After connection of the flange 44 to the flange 43, adjustment of the stator support structure 47 and securing of the stator thereon, the locking means can be removed. The drive train is completed thereby and is adjusted. During installation of the generators, the accuracy concerning the centering of the rotor achieved by the factory-based assembly of the generator remains intact.

The principle of a divided main shaft 3 can not only be applied in connection with bearing-less generators 4, 5 as shown in FIG. 1 but also in connection with generators 48, 49 as shown in FIG. 5 wherein the generator stators are rotatably supported by the main shaft. The generators 48, 49 are essentially identical. With respect to their rotor shafts and flanges 23, 24, 44, reference is made to the earlier description. Other than in the earlier description, the generators 48, 49 have no locking means, at least such locking means are not absolutely necessary. Rather the respective stator 50, 51 is supported by at least one, and preferably two bearings 52, 53; 54, 55 by the respective rotor shaft. As a result, the main shaft 3 carries the weight of the generators 48, 49. The stators 50, 51 are held in the gondola frame 7 so as to prevent their rotation but are otherwise not locked. Stator support structures 27, 47 are not needed. Instead torque struts 56, 57 are provided as shown in FIG. 6 in an exemplary manner for the torque strut 57. Such a torque strut comprises for example one or several tension or compression rods, for example a link 58 which, at one end, is pivotally connected to the gondola frame 7 and at its other end to the stator housing of the respective generator 48, 49.

Also in this arrangement, the generators 48, 49 can be completely pre-assembled. They are individually lifted unto the gondola 2 and installed therewith the shaft sections 17, 18 to form a complete main shaft.

This principle can also be applied in connection with wind power plants with only one generator, that is a generator 48 as well as with the use of several generators. In particular several generators may be arranged between the main bearings 8, 9 of the embodiments as shown in FIGS. 1 and 5.

In the gondola 2 according to the invention the main shaft 3 comprises several parts. The rotors 21, 45 of the generators 4, 5 form parts of the main shaft 3. Other shaft sections 17, 18 support the main shaft 3 on the machine carrier or, respectively, the gondola frame 7 and the rotor hub 6. The generators 4, 5 can be completely pre-assembled with the respective generator shaft 21 and delivered as an installation unit. With the pre-assembly of the generators, the rotor 21 and the stator 26 are fixed to each other by assembly aids. These assembly aids, i.e., locking means, are removed when the assembly of the whole drive train on the machine carrier or gondola frame 7 is completed.

The stator of the generator 26 is mounted on the gondola frame or machine carrier 7 by way of adjustable support legs.

Reference Numerals:
1 wind power plant
2 gondola
3 main shaft
4, 5 generators
6 hub
7 gondola frame
8, 9 main bearing
10 gondola support bearing
11 tower
12 axis of rotation
13, 14 rollers
15, 16 bearing rings
17, 18 shaft sections
19, 20 radial flange
21 rotor
22 rotor shaft
23, 24 flange
25 air gap
26 stator
27 stator support structure
28, 29 mounting blocks
30, 31 support members
32 stator housing
33, 34 intermediate member
35, 36 wedges
37 dash-dotted line
38 locking means
39, 40 sleeve-like holders
41, 42 bores
43, 44 flange
45 rotor
46 stator
47 stator support structure
48, 49 generators
50, 51 stators 52-55 bearings
56-57 torque struts

What is claimed is:

1. A gondola (2) of a wind power plant (1) for the generation of electric energy, comprising:
   a gondola frame (7) including first and second main bearings (8, 9) arranged in spaced relationship;
   a hollow main shaft (3) rotatably supported by the first and second main bearings (8, 9) and the hollow main shaft (3) being divided between the first and second main bearings (8, 9) into at least three shaft sections (17, 18, 22);
   the first shaft section (17) is supported by the first main bearing (8), the second shaft section (18) is supported by the second main bearing (9);
   a first generator (4) including a first rotor (21) including the third shaft section (22), the third shaft section (22) operatively arranged between and affixed to the first shaft section (17) and the second shaft section (18), the third shaft section (22) of the first generator (4) and the adjacent first shaft section (17) and second shaft section (18) having the same inside minimum diameter, and the first generator (4) including a first stator (26) connected to the gondola frame (7) so as to be non-rotatable relative thereto;
   a second generator (5) including a second stator (46) and a second rotor (45);
   the first stator (26) of the first generator (4) and/or the second stator (46) of the second generator (5) supported by the gondola frame (7); and,
   an adjustable support structure (27, 47) operatively arranged between the gondola frame (7) and the first stator (26) and the second stator (46), the adjustable support structure (27, 47) for supporting the first generator (4) and/or the second generator (5) on the gondola frame (7) so that the first stator (26) is adjustable and concentric with respect to the first rotor (21) and the second stator (46) is adjustable and concentric with respect to the second rotor (45).

2. The gondola according to claim 1, wherein the second generator (5) is arranged outside the two main bearings (8, 9).

3. The gondola according to claim 1, wherein the second stator (46) of the second generator (5) is connected to the gondola frame (7) so that it is not rotatable relative thereto and the second rotor (45) is connected to and part of the main shaft (3) for rotation therewith.

* * * * *